United States Patent
Linde et al.

(10) Patent No.: US 11,518,491 B2
(45) Date of Patent: Dec. 6, 2022

(54) DOOR ARRANGEMENT WITH ARTICULATED ARM, AIRCRAFT AREA WITH DOOR ARRANGEMENT AND AIRCRAFT WITH AIRCRAFT AREA

(71) Applicant: Airbus Operations GmbH, Hamburg (DE)

(72) Inventors: Peter Linde, Hamburg (DE); Matthias Hegenbart, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 471 days.

(21) Appl. No.: 16/695,544

(22) Filed: Nov. 26, 2019

(65) Prior Publication Data
US 2020/0172222 A1 Jun. 4, 2020

(30) Foreign Application Priority Data

Nov. 30, 2018 (DE) ...................... 10 2018 130 527.3

(51) Int. Cl.
*B64C 1/14* (2006.01)
*E05D 15/56* (2006.01)

(52) U.S. Cl.
CPC ............ *B64C 1/1407* (2013.01); *E05D 15/56* (2013.01); *E05Y 2201/624* (2013.01); *E05Y 2900/502* (2013.01)

(58) Field of Classification Search
CPC ....... B64C 1/1407; B64C 1/143; E05D 15/56; E05D 3/14; E05Y 2201/624; E05Y 2900/502
See application file for complete search history.

(56) References Cited

U.S. PATENT DOCUMENTS 6,638,466 B1 * 10/2003 Abbott .................. B29C 70/462
264/258
7,543,778 B2  6/2009 Baderspach et al.
(Continued)

FOREIGN PATENT DOCUMENTS

DE       602005000111 T2    1/2007
FR           3071222 A1 *   3/2019  ........... B64C 1/1407
FR           3097194 A1 *  12/2020  ............ B64C 1/143

OTHER PUBLICATIONS

Machine translation of abstract of reference Romec (FR Pub No. 3,071,222) Pub Date Mar. 22, 2019 (Year: 2019).*

(Continued)

*Primary Examiner* — Rodney A Bonnette
(74) *Attorney, Agent, or Firm* — Greer, Burns & Crain, Ltd.

(57) ABSTRACT

A door arrangement for an aircraft comprising a door designed to close an aperture in an outer skin of the aircraft, and a articulated arm which is fixed by a first end to the door and which is designed to move the door in at least two translational directions and at least two rotational directions. An aircraft area with this door arrangement and an aircraft having such an aircraft area are furthermore provided. The aircraft area comprises a door aperture arranged in an outer skin of an aircraft, and a door arrangement. Here the door of the door arrangement may be designed to close the door aperture from an inside of the outer skin, and the articulated arm of the door arrangement may be fixed to the aircraft area.

13 Claims, 9 Drawing Sheets

(56) References Cited

U.S. PATENT DOCUMENTS

2005/0287383 A1* 12/2005 Taylor ..................... B32B 27/18
                                                          428/500
2019/0351641 A1* 11/2019 Massey, Jr. ............ B62D 29/04
2021/0387713 A1* 12/2021 Dubosc ................. B64C 1/1438

OTHER PUBLICATIONS

Machine translation of abstract of reference Capron et al. (FR Pub No. 3,097,194) Pub Date Dec. 18, 2020 (Year: 2020).*
German Search Report; priority document, dated Apr. 15, 2019.

* cited by examiner

DOOR ARRANGEMENT WITH ARTICULATED ARM, AIRCRAFT AREA WITH DOOR ARRANGEMENT AND AIRCRAFT WITH AIRCRAFT AREA

CROSS-REFERENCES TO RELATED APPLICATIONS

This application claims the benefit of the German patent application No. 10 2018 130 527.3 filed on Nov. 30, 2018, the entire disclosures of which are incorporated herein by way of reference.

FIELD OF THE INVENTION

The invention relates to a door arrangement having an articulated arm, which moves a door of the door arrangement in at least two translational directions and at least two rotational directions. The invention further relates to an aircraft area having such a door arrangement and an aircraft having such an aircraft area.

BACKGROUND OF THE INVENTION

An aircraft door and an area of an aircraft fuselage surrounding a door aperture is exposed to particular stresses due to the differences in pressure between the surroundings of the aircraft and the aircraft interior. For example, at high altitudes a force of 55 to 65 $kN/m^2$ acts on an aircraft door due to the pressure ratio between the aircraft interior and the outside of the aircraft.

Figure 1A:
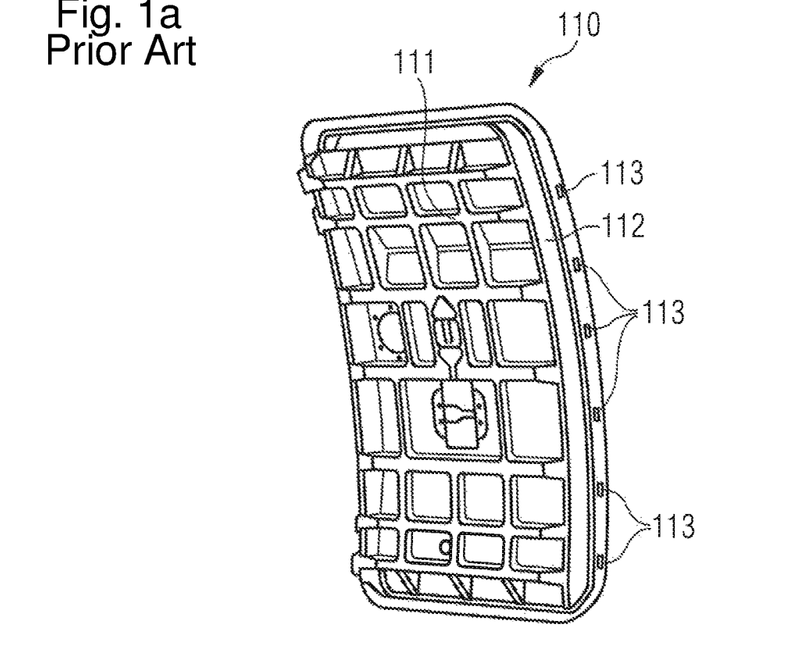
FIGS. 1a and 1b show a perspective and a front elevational view of a conventional door.
Figure 1B:
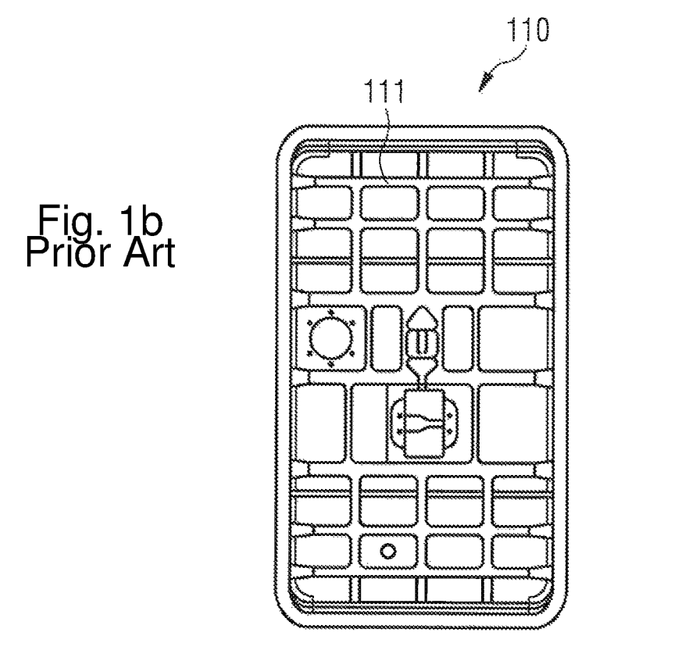
Figure 2:
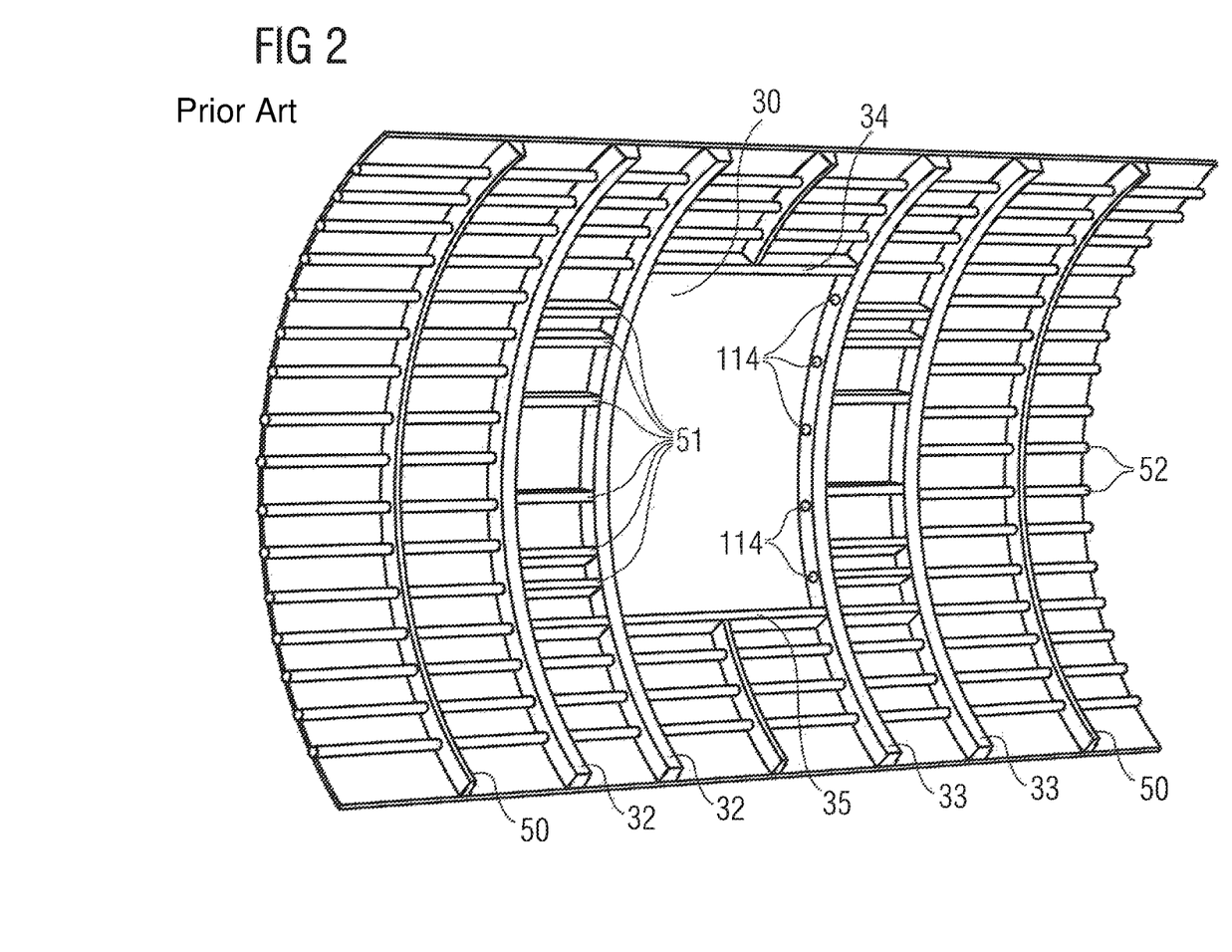
FIG. 2 shows a conventional aircraft area having a door aperture, FIG. 3 schematically shows an aircraft area having a door aperture to explain the present invention, FIGS. 4a-4c to 8a-8c schematically show views and cross sections of a door arrangement in various states of the door of the door arrangement to explain the present invention, and FIG. 9 schematically shows a view and cross sections of a door to explain the present invention.

For this reason, a conventional aircraft door 110, as represented in FIGS. 1a and 1b, has a body which comprises a multiplicity of ribs 111, 112, in order to absorb the compressive load acting on the aircraft door evenly and distribute it uniformly. Multiple doorstops 113 are furthermore provided on the two lateral edges of the aircraft door 110. These interact with corresponding doorstops 114 on the fuselage, as represented in FIG. 2. In order to bring the doorstops 113 and 114 into engagement, the door 110 is closed by swiveling it from outside into the door aperture 30, the doorstops 113 and 114 being arranged one on top of the other. The door 110 is then moved upwards or downwards, bringing each of the doorstops 113 and 114 into an overlap, so that the doorstops 113 of the door 110 can be outwardly braced against the doorstops 114 on the fuselage. Seals are moreover arranged along the outer peripheral side of the door 110 and/or along the aircraft structure 32-35 surrounding the door aperture 30, in order to securely seal the door aperture.

FIG. 2 furthermore shows how the aircraft structure is reinforced around the door aperture 30, in order to absorb and distribute the door loads, and in particular the spot-loading forces introduced by the doorstops 113, 114. For this purpose, reinforced door frames 32, 33 are provided parallel to the other formers 50 of the aircraft structure and reinforced stringers 51 (intercostals) between the reinforced door frames 32, 33. These reinforcements are necessary, since at least one former is interrupted by the door aperture 30.

SUMMARY OF THE INVENTION

An object of the invention is to provide a door arrangement having a simpler construction, an aircraft area having a simpler construction and a correspondingly equipped aircraft, in which a door of the door arrangement still efficiently absorbs the loads occurring and introduces them into the aircraft structure of the surrounding aircraft area.

A door arrangement for an aircraft comprises a door, which is designed to close an aperture in an outer skin of the aircraft, and an articulated arm, which is fixed by a first end to the door and which is designed to move the door in at least two translational directions and at least two rotational directions. In other words, the articulated arm may be designed, at one of its ends on which the door is arranged, to be moved in at least four out of six degrees of freedom. The articulated arm itself may have fewer or more degrees of freedom but it must be capable of moving the door fixed to its door-side end in two translational directions and two rotational directions. The door may be a door panel or similar component, for example, which is of such dimensions as to completely close a door aperture.

Such a door arrangement, and, in particular, the articulated arm, allows a movement of the door (the door panel) which goes beyond a simple swiveling and then raising or lowering, as in the case of conventional doors. The door can thereby be moved through the door aperture into the interior of the aircraft and be applied to the door aperture from inside, allowing the door to be of greater dimensions than the door aperture, as a simple way of completely closing the latter.

In one design variant of the door arrangement, the articulated arm may comprise at least two arm members, an articulated link arranged between the two arm members and an articulated link arranged at the first end and the second end respectively of the articulated arm. The three articulated links arranged in series with one another allow the door arranged at one end of the articulated arm to be turned about at least two axes of rotation.

For example, the articulated arm may comprise three articulated links arranged in series with one another, which each have a different (non-parallel) axis of rotation. In other words, the articulated arm has three degrees of freedom, which means, however, that the door fixed to the articulated arm can be moved in more degrees of freedom.

Alternatively, two articulated links, which are situated further away from the door than the third articulated link, may have axes of rotation arranged substantially parallel to one another, thereby allowing a (translational) movement of the door from the door aperture into the aircraft interior and through the door aperture to the outside of the aircraft. In the same way, the door can be moved in a second translational direction (preferably perpendicular to the translational movement of the door first described) by virtue of the two more remote articulated links.

The terms "substantially perpendicular" and "substantially parallel" here mean that the corresponding axes or elements are intended to be perpendicular or parallel to one another. However, an orientation of precisely 90° or 180° is not essential here. In the present disclosure the terms "substantially perpendicular" and "substantially parallel" therefore signify 90°+/−5° or 180°+/−5°.

Alternatively or in addition to this, the articulated arm may also comprise four or more articulated links arranged in series with one another, in order to move the door in at least two translational directions and at least two rotational directions. Likewise, alternatively or in addition, the articulated arm may also comprise at least two articulated links arranged parallel to one another and/or at least two arm members arranged parallel to one another. A specific portion of the articulated arm thereby affords a parallel displacement of the two ends of the particular portion.

In a further design variant, at least one of the arm members may comprise at least two portions and be designed to move at least the two portions relative to one another in a longitudinal direction of the respective arm member. In other words, the length of the arm member can be adjusted. This allows the two articulated links, which are arranged at the respective ends of the arm member, to be moved towards or away from one another, thereby creating a greater space for movement of the door fixed to the articulated arm. In particular, this makes it possible to perform a translational movement of the door in (virtually) any direction in the coordinate system as a function of the position of the articulated links of the arm member.

For example, at least the one arm member may comprise a linear drive, which is designed to move the two portions relative to one another. The linear drive may be a linear motor (electric, hydraulic and/or pneumatic) or a rack or spindle driven by a pinion. Here the linear motor and the rack/spindle are arranged in the longitudinal direction of the arm member.

In a further design variant, the articulated link arranged at the first end of the articulated arm and/or the articulated link arranged at the second end of the articulated arm may be designed to turn about at least two axes of rotation. For example, the articulated link to which the door is fixed may be turned about two different axes of rotation, so that the door at the end of the articulated arm can be moved according to two rotational degrees of freedom. Thus, in one exemplary embodiment, the two axes of rotation of the articulated link run substantially perpendicular to one another.

Alternatively or in addition to the design variants, the door arrangement may further comprise an overlay, portions of which, at least, are arranged on a periphery of the door and which is designed to brace and/or seal the door in relation to an element surrounding the door aperture. The overlay may be produced from the same material as the rest of the door, that is to say, integrated into the door. Alternatively or in addition, the overlay may be composed of a softer material, so that the door can be elastically braced against the door frame (formed on the aircraft fuselage). Furthermore, the material of the overlay may interact with the door frame to form a seal. For example, the overlay and/or the door frame may be produced from a material and/or coated, so as to produce a fluid seal between the overlay of the door and the door frame.

In a further design variant, the door may be provided throughout on its outside with an elastic material. When closing the door aperture in the outer skin of the aircraft the door can thereby form a surface flush with outer skin of the aircraft. In other words, the outside of the door is compressed in the area of the overlay whilst in the remaining area of the door, that is to say, in particular, in the area of the door aperture, the external surface of the door can project or be pressed into the aperture. Alternatively or in addition, a less elastic material or a material as is also used for the outer skin of the aircraft may be provided in an inner panel of the outside of the door which, for example, corresponds (substantially) to the dimensions of the door aperture. If the door is then closed from inside, the inner panel can be set into the door aperture, thereby externally creating a continuous surface with the outer skin, while at the same time forming a seal between the door and outer skin of the aircraft in the area of the overlay (which is situated around the inner panel, for example). In the opened state of the door, the inner panel may also lift off from the surface of the overlay, that is to say, constitute a raised area in relation to the surface of the overlay.

In yet a further design variant the door may be produced from a sandwich material. Here, at least one layer of a material forming the door is applied to a core. For example, at least one layer of a material forming an outer side of the door may be applied to the core, while at least one layer of a material forming an inner side of the door is applied to the core. This may be one and the same material. Alternatively, different materials may also be used in order to give the door different characteristics on the outer side and on the inner side. For example, the material for the outer side may be weather-resistant, since it is exposed to extreme conditions (temperature, the effect of radiant energy, flow velocities, etc.), which is generally used for manufacturing the outer skin of an aircraft. A more beneficial material, or a visually appropriate material to suit the wishes of the aircraft operator, can therefore be used for the inner side of the door.

Alternatively or in addition, the door, in a predefined portion along at least one edge of the door, may have a smaller cross-sectional thickness than at a center of the door. Savings can thereby be made on the material used for the door, for example the core of the door, making the door lighter overall. Owing to the compressive forces acting on the door, the center of the door must be of the strongest design. Furthermore, the articulated arm (that is to say, one end of the articulated arm) can be attached in/at this center of the door. This obviates the need for additional reinforcements in the door.

In one design variant of the door, the sandwich material of the door may comprise a core of a honeycomb structure. Such a honeycomb structure is easy and cost-effective to produce. Furthermore, a honeycomb structure is easy to produce or machine in different cross-sectional thicknesses, making it easy to produce the shape of the door. For example, the honeycomb structure can be produced in the desired shape or brought to the desired shape by material removal. In one particular design variant of the door, the core may be produced from aluminum. Alternatively, the core of the sandwich structure may be composed of a phenolic resin-impregnated material.

In yet a further design variant, the articulated arm comprises braking mechanisms and/or holding mechanisms in order to hold the individual arm members and articulated links in a specific position. For example, the articulated arm may be fixed in its required position by the braking mechanisms and/or holding mechanisms in an opened position of the door and in a closed position of the door.

According to a further aspect, an aircraft area comprises a door aperture arranged in an outer skin of an aircraft, and a door arrangement according to the first aspect. Here the door of the door arrangement may be designed to close the door aperture from inside the aircraft. By closing the door aperture from the inside, it is possible to dispense with doorstops both on the door and in the aircraft area around the door aperture. This not only simplifies the construction of that area of the aircraft area, but also reduces the time taken to fit the door area in the aircraft, since it eliminates any fixing and, in particular, an otherwise time-consuming adjustment of the position of doorstops.

In one design variant, the articulated arm of the door arrangement may be fixed to the aircraft area. For example, one end of the articulated arm may be fixed to a structural component of the aircraft in the aircraft area next to the door aperture. Alternatively, the end of the articulated arm may be fixed to multiple structural components next to the door aperture. These may be formers and/or stringers of the aircraft structure.

Since the construction of the door is simplified in comparison to conventional aircraft doors, making the door lighter, fewer load stresses are also introduced into the aircraft structure by the articulated arm. The articulated arm itself can also be of more lightweight design than conventional hinges and door opening mechanisms. These load stresses moreover occur principally when the articulated arm moves the door or holds it in an opened state. The compressive loads on the door that occur in flight due to the different pressure ratios inside and outside the aircraft do not have to be supported by way of the articulated arm, as is at least sometimes the case with conventional aircraft doors.

In a further design variant, the door may comprise a peripheral area, which overlaps with the outer skin and/or a component of the aircraft area arranged thereon when the door closes the door aperture. In other words, the outer skin and/or the component arranged thereon comprises a peripheral support for the peripheral area of the door, so that the compressive loads acting on the door as described above can be extensively transmitted to the surrounding aircraft fuselage structure and need not be transmitted at isolated points via doorstops as in the case of conventional doors. This simplifies the design both of the door and of the aircraft area arranged around the door aperture and it is possible to dispense with additional reinforcements of the aircraft structure.

In one design variant the articulated arm may be designed to arrange the door by rotation relative to the door aperture. In other words, the articulated arm is capable of turning the door (for example, relative to a closed state). In this case, the rotation of the door produced by the articulated arm may bring the door into a position in which the projected area of the door, at least in parts, does not overlap the projected area of the door aperture, when the door aperture is viewed in the Y-direction, that is to say, in top view or looking at the door aperture in a direction substantially perpendicular to a plane formed by the door aperture. For example, the articulated arm may first move the door into the aircraft interior, in order to afford a greater clearance. The door may then be turned about an axis of rotation which runs perpendicular to a surface of the door at the center of the door, for example. Alternatively or in addition, the door may be turned about an axis of rotation which runs parallel (tangentially) to the surface of the door at the center of the door. The door can thereby be brought into a position in which it has, at least in part, a projected area which does not overlap with the projected area of the door aperture. In other words, the door in this portion can be moved through the door aperture. By further rotation and a translational movement of the door, the door is moved through the door aperture to the outside of the aircraft. As a result, a portion of the door which is situated just inside the door aperture may always have a projected area that does not overlap with the projected area of the door aperture in this area.

Furthermore, the articulated arm may be designed to arrange the door on the outside of the aircraft area so that the door aperture is, at least for the most part, exposed. For example, the door may be arranged to the side of the door aperture on the outside of the aircraft. Depending on the dimensions of the door aperture and/or the door, it may also be possible to provide some overlap of the door with the door aperture, the projected area of the door aperture that is not covered by the door being sufficient to allow the safe entry and exit of passengers and/or cargo. Here the articulated arm fixed in the interior of the aircraft reaches around the edge of the outer skin of the aircraft forming the door aperture and alternatively also a structural component of the aircraft next to the door aperture (for example a former or stringer). Through corresponding arrangement of the arm members and articulated links of the articulated arm it is possible for the articulated arm to assume a U-shaped or J-shaped form, for example, one end of the articulated arm being fixed inside the aircraft and another end of the articulated arm, to which the door is fixed, being situated outside the aircraft.

In various design variants the end of the articulated arm fixed inside the aircraft may be arranged at any point around the door aperture. For example, the articulated arm may also be fitted above a door lintel, and, in particular, next to an upper corner of the door aperture, where it presents least obstruction to passengers boarding and exiting when the door is in its opened state and the articulated arm extends through the door aperture.

In a further design variant, the aircraft area may have no additional stringers or no reinforcements running in the longitudinal direction of the aircraft in an area between a main door frame and a former arranged next to the main door frame. The simpler design of the door and/or the absence of doorstops, and/or the extensive introduction of compressive forces from the door into the aircraft structure make it possible to dispense with the conventional reinforcements of the aircraft fuselage structure (primary structure of the aircraft) around a door aperture. This aircraft area is thereby of simpler construction and also lighter.

According to a further aspect an aircraft comprises at least one aircraft area according to the second aspect.

Although not explicitly described, the embodiments and variants described above can obviously be combined. The present disclosure is therefore not limited to the individual embodiments and design variants in the order described or to a specific combination of the design variants.

BRIEF DESCRIPTION OF THE DRAWINGS

A preferred embodiment of the invention is now explained in more detail with reference to the schematic drawing attached, in which.

DETAILED DESCRIPTION OF THE PREFERRED EMBODIMENTS

Figure 3:
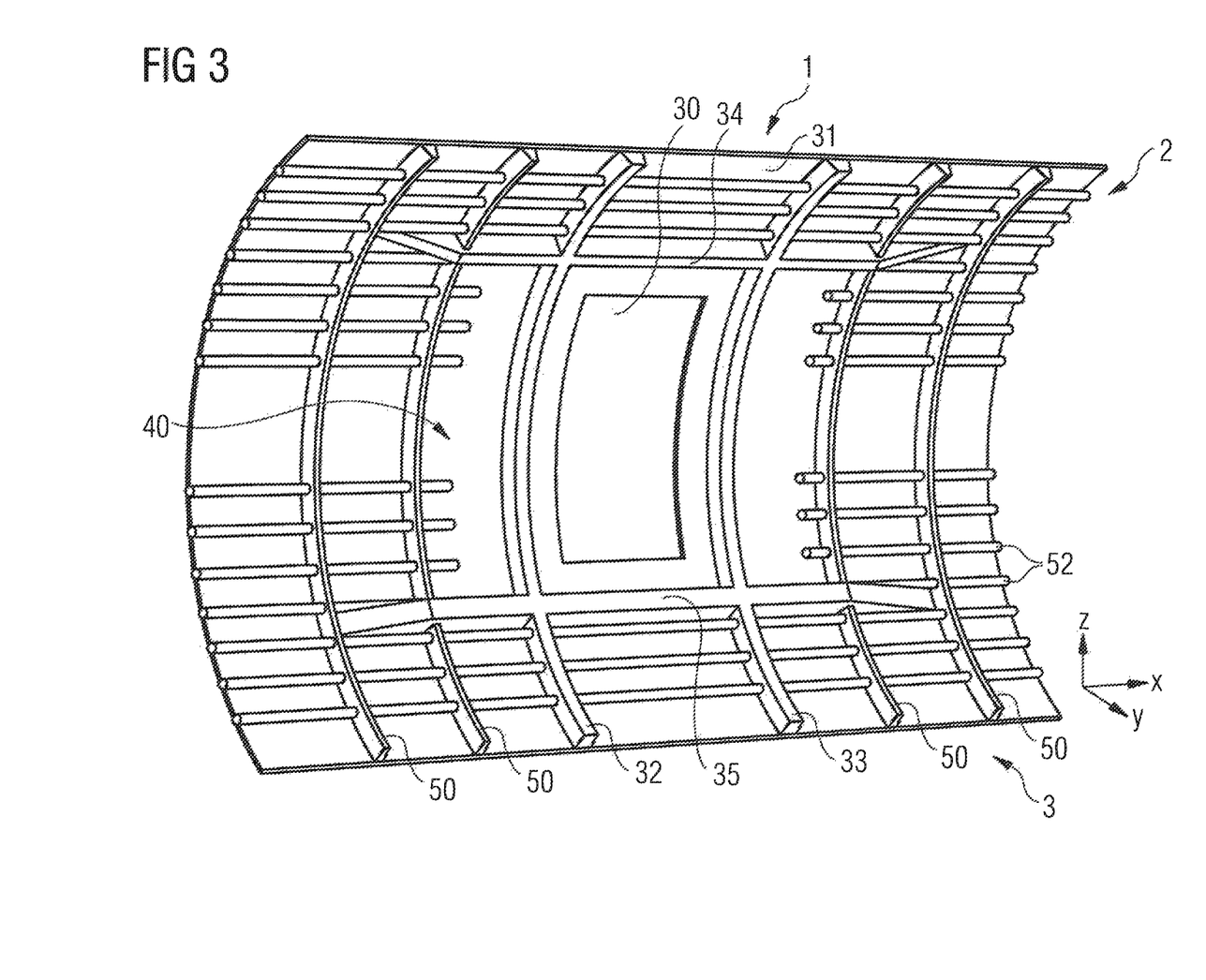

The aircraft area 3 represented schematically in FIG. 3 around a door aperture 30 comprises a multiplicity of formers 50, which are each arranged in a cross-sectional plane of the fuselage of the aircraft 2. In the area of the door aperture 30, at least one of these formers 50 is absent, so that door frames 32, 33, likewise arranged in a cross-sectional plane of the aircraft fuselage, are provided. In the longitudinal direction (X-axis) of the aircraft 2, multiple stringers 52 are provided on which the outer skin 31 of the aircraft is generally arranged. Here a reinforced door lintel 34 and a reinforced door sill 35 are provided in the area of the door aperture 30, in order to divert the load stresses in the primary structure of the aircraft around the door aperture and/or to absorb these.

In contrast to the conventional aircraft area shown in FIG. 2, the aircraft area 3 according to the present invention in FIG. 3 has no reinforced stringers 51 in the areas 40 next to the door frames 32, 33. The reason for this, in particular, is that with the embodiment represented in FIG. 3 to explain the present invention, it is possible to dispense with doorstops 114 (FIG. 2) and therefore to eliminate the introduction of spot loads.

In order to close the door aperture 30 in the aircraft area 3 (FIG. 3 explaining the present invention), a door arrangement 1 is provided, as will now be explained in more detail with reference to FIGS. 4 to 9. For reasons of clarity, the door arrangement 1 is not represented in FIG. 3.

Figure 4A:
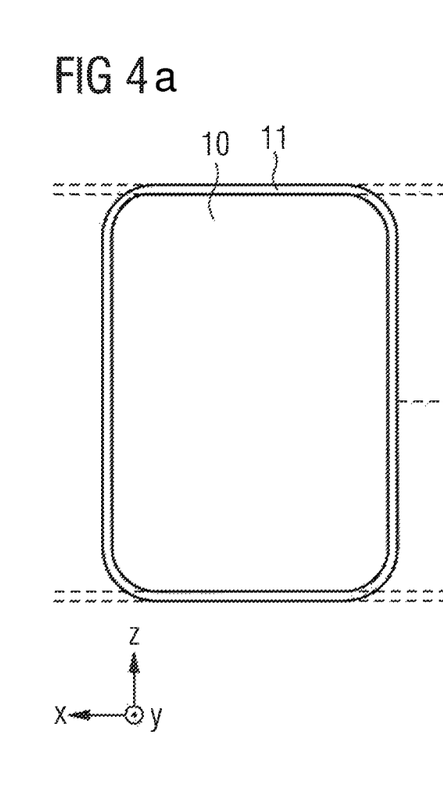
Figure 4B:
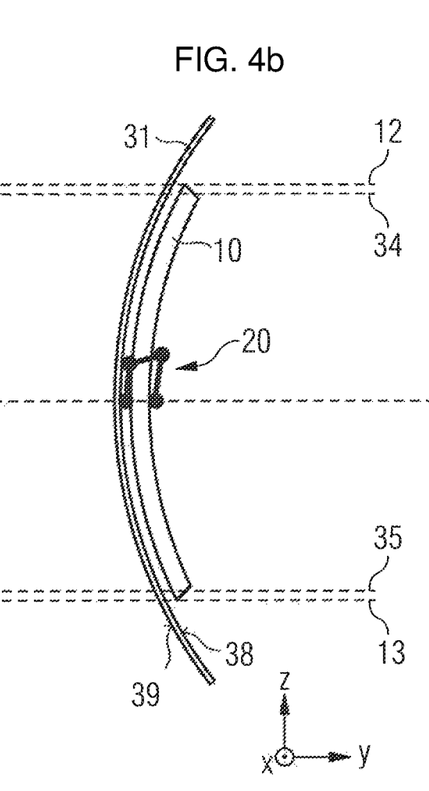
Figure 4C:
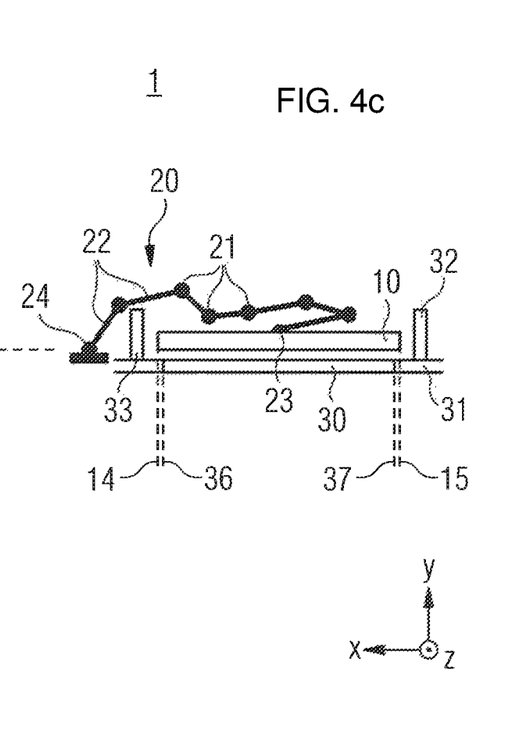

FIGS. 4a-4c schematically show a view (top view—FIG. 4a) in the direction of the Y-axis, a cross section viewed in the direction of the X-axis (longitudinal axis of the aircraft 2—FIG. 4b) and a cross section viewed in the direction of the Z-axis (in each case perpendicular to the X-axis and Y-axis—FIG. 4c) of an exemplary door arrangement 1. The door arrangement 1 comprises a door 10, which is designed to close an aperture 30 in an outer skin 31 of the aircraft 2. The door arrangement 1 further comprises an articulated arm 20, which is fixed by a first end 23 to the door 10 and which is designed to move the door 10 in at least two translational directions and at least two rotational directions.

In FIGS. 4a-4c, the door 10 is represented in a closed state. Here the door 10 comprises an overlay 11, which is arranged, at least in part, on an a periphery of the door 10 and which is designed to brace and/or seal the door 10 in relation to a door frame (for example portions of the door frames 32, 33 and/or door lintel 34 and/or door sill 35) and/or an outer skin 31 (in particular, an inside 38 of the outer skin 31). In the cross section in the direction of the Y-axis in FIG. 4b the door 10 is shown separated by a distance from the outer skin 31. This serves merely for the purposes of illustration and to show the individual elements more clearly. In the closed state of the door 10 the outer side of the door 10 obviously coincides with the outer skin 31 of the aircraft 2 (they are in contact with one another), and they can therefore form an unbroken outer surface of the aircraft 2.

In the area of the overlay 11, a projected area of the door 10 (viewed in a direction along the Y-axis) overlaps a projected area of the outer skin 31 surrounding the door aperture 30. In other words, in the closed state of the door 10 represented in FIGS. 4a-4c the outside edges 12, 13, 14, 15 of the door 10 lie outside the inside edges 34 (door lintel), 35 (door sill), 36, 37 (each door frame) of the door aperture 30.

The articulated arm 20 of the door arrangement 1 is firmly connected at a first end 23 to the door 10 in order to hold and move the door 10. At a second (opposite) end 24 of the articulated arm 20 the articulated arm 20 is fixed to the fuselage structure of the aircraft 2. Between the first end 23 and the second end 24 the articulated arm comprises at least two arm members 22 and at least one articulated link 21 arranged between the arm members 22. The articulated arm may obviously comprise more arm members 22 (as represented in FIG. 4c), which are each coupled in series by means of articulated links 21 to the adjacent arm member 22. At the first end 23 and/or the second end 24 the articulated arm may also comprise an articulated link 21. The number of arm members 22 and articulated links 21 may be selected according to the desired movement of the door 10. In the same way, it is also possible to select the length of the arm members 22 for each arm member 22 (or alternatively for them to be all of equal length), in order to obtain the desired opening space of the door 10.

FIGS. 5a-5c to 8a-8c show further states of the door 10, while the door 10 is being opened (being moved from the closed state to an opened state). For the sake of clarity, not all elements are provided with reference numerals in FIGS. 5a-5c to 8a-8c. Only optional features are represented separately, for example, in FIGS. 5a-5c and provided with reference numerals, and elements important for the description of the respective opening state are provided with reference numerals. For the rest, the elements represented in FIGS. 4a-4c are all present in the schematic drawings in FIGS. 5a-5c to 8a-8c.

At the beginning of the process for opening the door 10, the door 10 is moved into the interior of the aircraft by the articulated arm 20. This may involve a translational movement in the direction of the Y-axis and/or a rotation about the Y-axis and/or Z-axis. For example, an articulated link 21 may be arranged at the first end 23 of the articulated arm 20, to which the door 10 is fixed, allowing rotations about two axes of rotation.

Figure 5A:
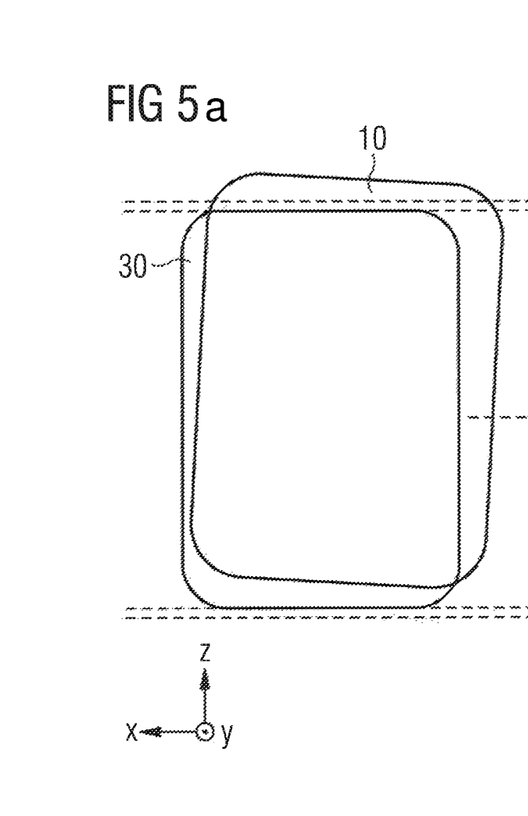
Figure 5B:
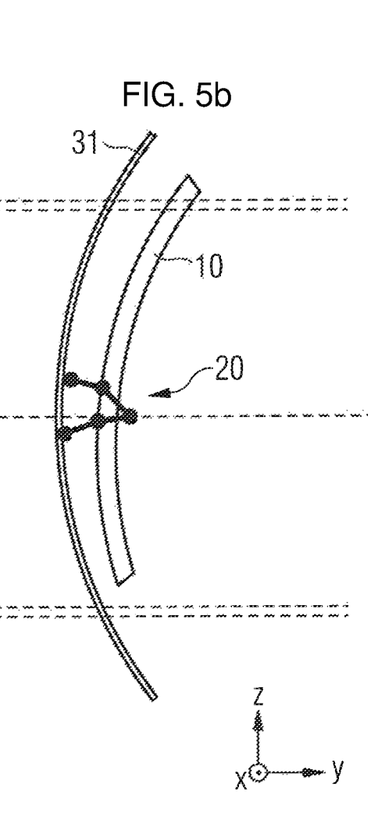
Figure 5C:
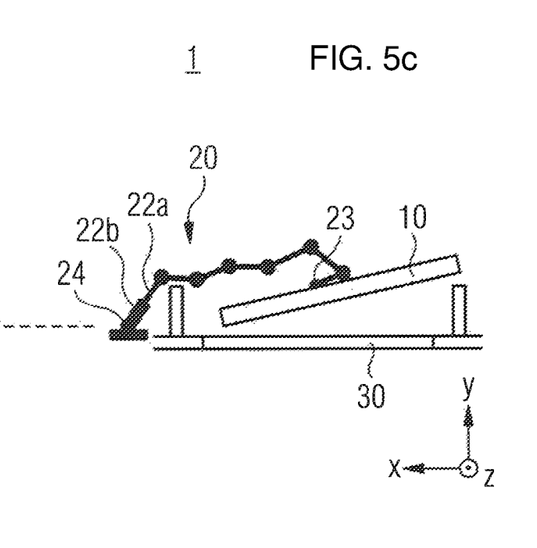
Figures 6A, 6B:
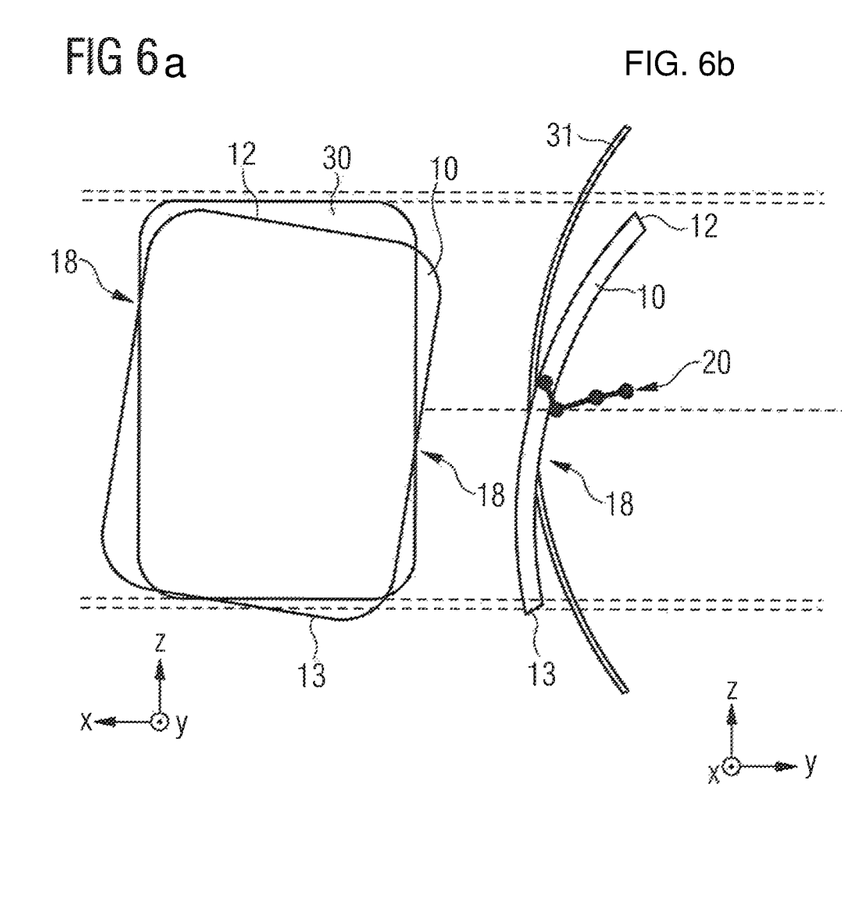
Figure 6C:
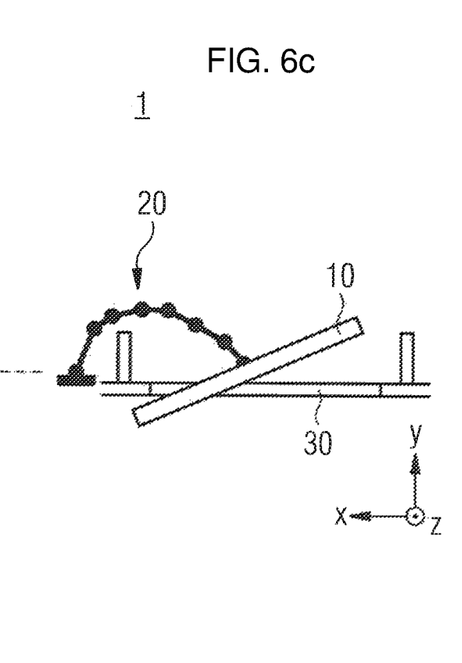

Furthermore, at least one of the arm members 22 may optionally also comprise at least two portions 22a, 22b, only one arm member 22 comprising two portions 22a, 22b being represented in FIG. 5c. The arm member 22 may be designed to move at least the two portions 22a, 22b relative to one another in a longitudinal direction of the arm member 22, so that the arm member 22 may assume a different length.

As can be seen from FIGS. 5a-c and 6a-c, the door 10 is moved by translation and/or rotation, so that in a top view of the door aperture 30 in the direction of the Y-axis at least some portions (for example in the portion 18 shown) of the projected area of the door 10 does not overlap the projected area of the door aperture 30. In other words, the door 10 comprises a portion which, viewed in the direction of the Y-axis, is arranged so that the door 10 can be guided through the door aperture 30. For example, between FIGS. 5a, 5b and 6a, 6b a lower end 13 (lower edge 13) of the door 10 may first be moved through the door aperture 30, and the entire door 10 moved through the door aperture 30 in a subsequent oblique downwards movement. An upper end 12 of the door 10 may obviously also be moved through the door aperture 30 and the entire door 10 moved through the door aperture 30 in a subsequent oblique upwards movement. In further optional variants the door 10 may also be moved through the door aperture 30 in a sideways movement. It is equally feasible to turn the door 10 about the Y-axis and the Z-axis, so that the door 10 is led outwards through the door aperture 30 with a lateral edge 14, 15 first, for example on one of the diagonals of the door aperture 30.

Figures 7A, 7B:
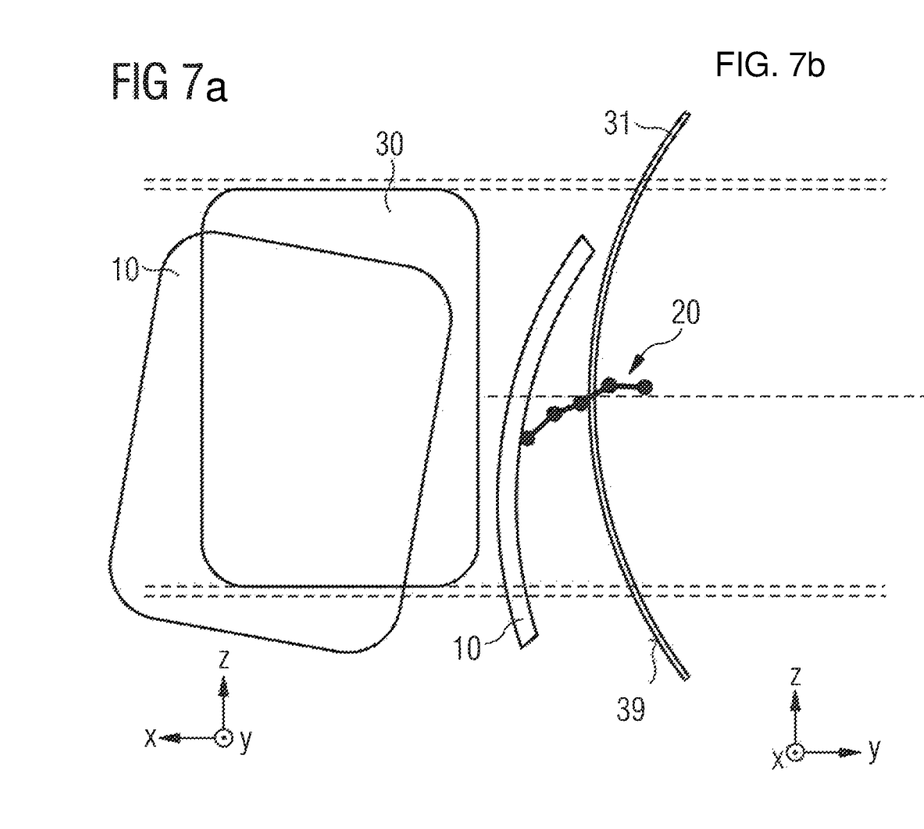
Figure 7C:
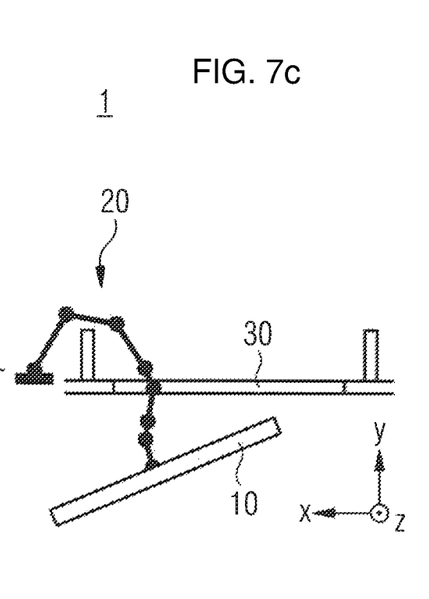
Figures 8A, 8B, 8C:
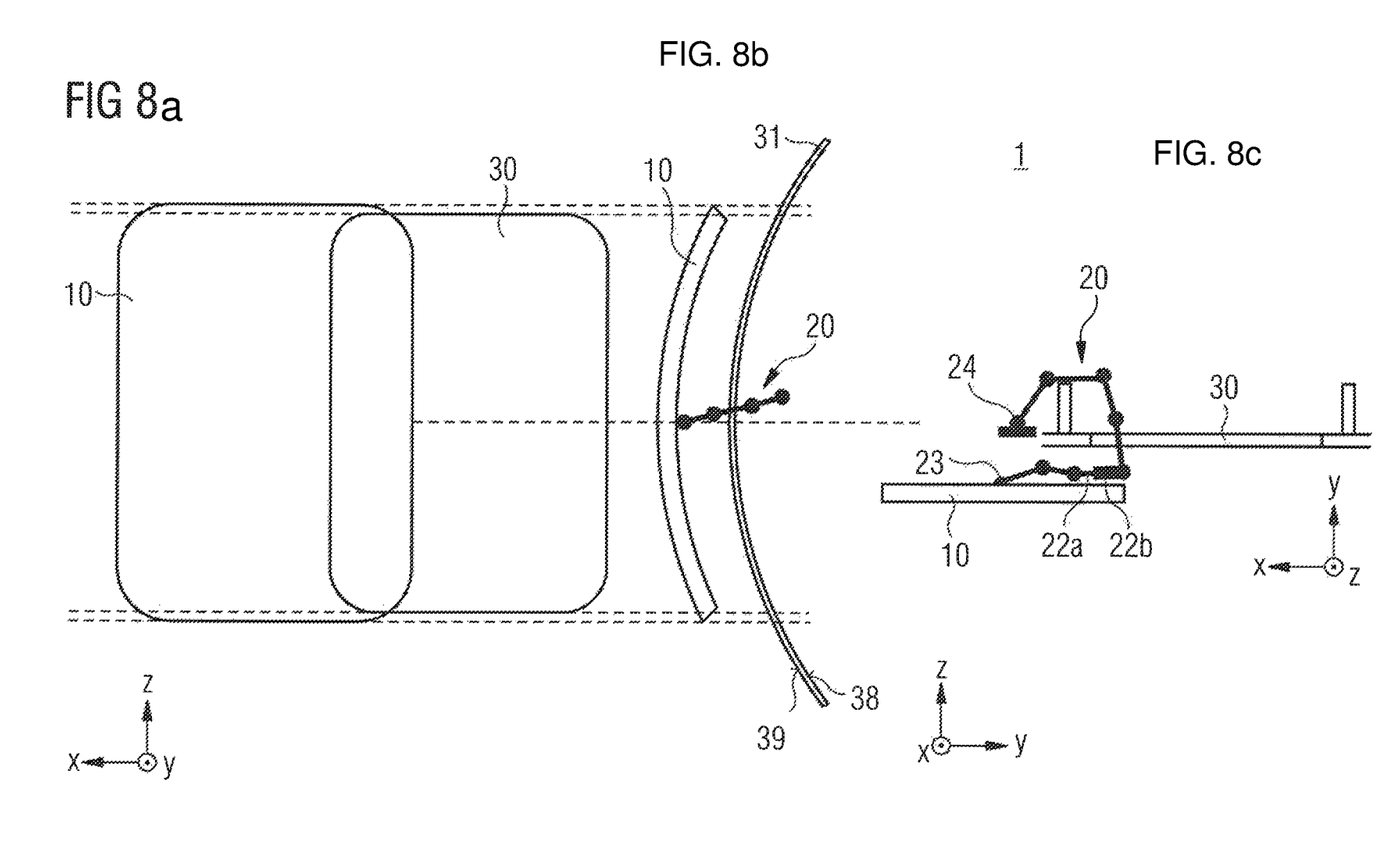
Figure 9:
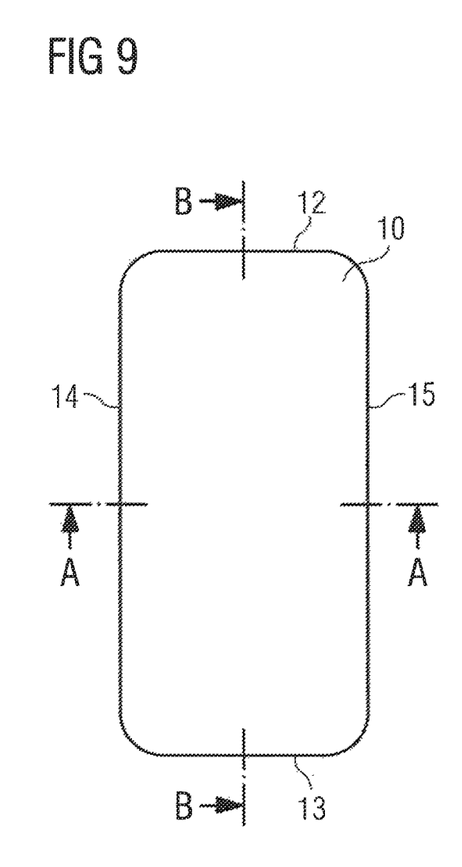
Figure 9A:
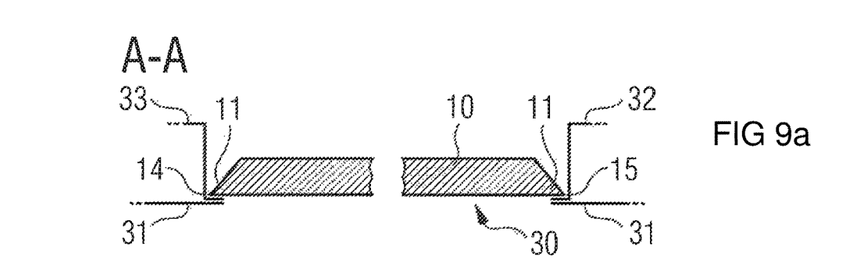
Figures 9B, 9C:
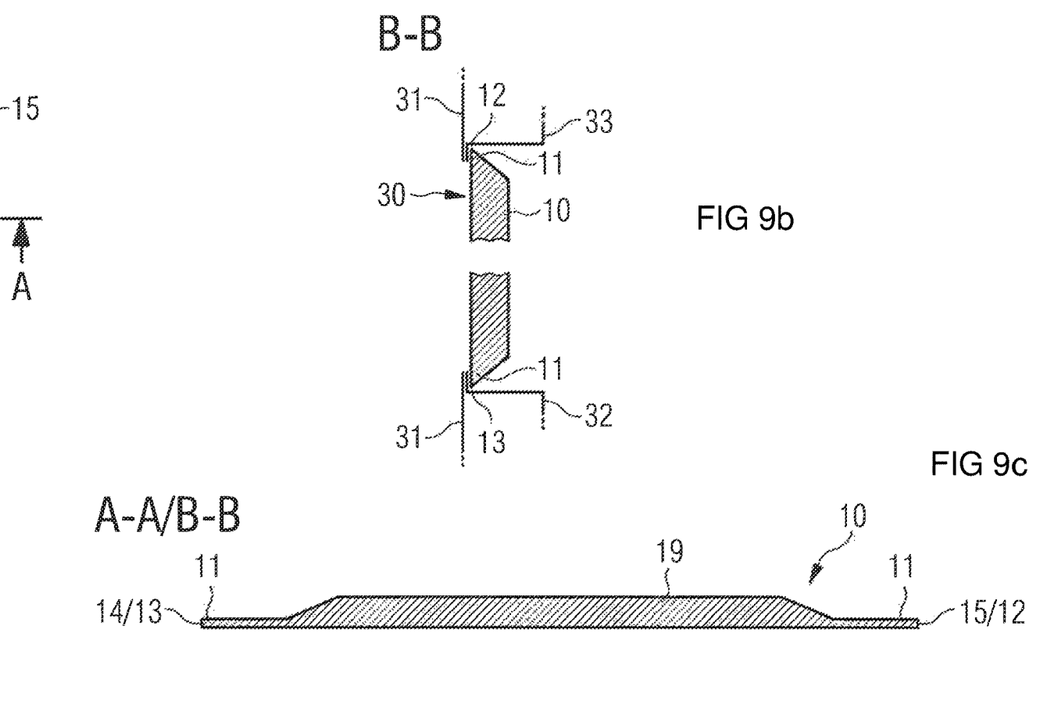

FIGS. 7a-7c show the state in which the entire door 10 has been brought to an outside 39 of the outer skin 31 of the aircraft 2. Then, as shown in FIGS. 8a-8c, the door 10 can be moved along the outside 39 of the outer skin 31 of the aircraft 2 (for example parallel to the outer skin 31; along the X-axis), in order to expose (almost all) the door aperture 30. Here again, a movement in the longitudinal direction of an arm member 22 may also be employed, for example through the use of two arm member portions 22a, 22b moving relative to one another. The articulated arm 20 may furthermore assume a U-shaped or J-shaped form, so as to extend from its second end 24 on the inside 38 of the outer skin 31 to its first end 23 on the outside 39 of the outer skin 31.

The door 10 may obviously be carried out of the inside of the aircraft on a curving path by means of the articulated arm 20 rather than in individual, abstract movements of separate articulated links 21 and arm members 22. For this purpose, the articulated arm 20 is connected to a control (not shown), which controls the movement of the articulated arm 20. For example, the movements of the individual articulated links 21 may be controlled in series or simultaneously, in order to bring the door 10 into the opened state and back into the closed state.

Furthermore, the articulated arm 20 may be provided with one or more drives, which produce a movement of the articulated arm 20 (or more precisely the arm members 22) about the articulated links 21. These drives may take the form of an electric motor and/or a hydraulic and/or pneumatic motor.

FIGS. 9 and 9a-9c show a view and cross sections of the door 10. In one or both of the cross sectional axes, the door 10 may have a cross section which at the center of the door 10 has a thicker core 19 than in the edge area, in which an overlay 11 is formed. The overlay 11 may be provided, at least in portions, along one or all of the outer edges 12, 13, 14, 15, for example. Here the overlay 11 may overlap with the outer skin 31 and/or a component 32, 33, 34, 35 of the aircraft area 3 arranged therein, when the door 10 closes the door aperture 30. The core 19 may be a core 19 made of aluminum or a resin, which is coated on the outer side and/or inner side. For example, a core 19 may be formed from a honeycomb material through suitable coating to produce a sandwich panel. Here the core 19 may be produced so that it reflects the basic structure (basic shape) of the door 10. This allows a lightweight and cost-effective door to be produced.

The embodiments described in FIGS. 3 to 9c are not intended to limit the present invention. Rather, they serve merely for an understanding of the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A door arrangement for an aircraft, comprising:
a door, configured to close an aperture in an outer skin of the aircraft,
an articulated arm, fixed by a first end to the door, and configured to move the door in at least two translational directions and at least two rotational directions, wherein the articulated arm comprises:
at least two arm members,
a first articulated link arranged between the two arm members,
a second articulated link arranged at the first end of the articulated arm, and
a third articulated link arranged at the second end of the articulated arm,
wherein the second articulated link arranged at the first end of the articulated arm is configured to turn about at least two axes of rotation, the two axes of rotation running perpendicular to one another, or
the third articulated link arranged at the second end of the articulated arm is configured to turn about at least two axes of rotation, the two axes of rotation running perpendicular to one another.

2. The door arrangement according to claim 1, further comprising:
an overlay, portions of which, at least, are arranged on a periphery of the door and which is configured to at least one of brace or seal the door in relation to an element surrounding the door aperture.

3. The door arrangement according to claim 1, wherein the door is produced from a sandwich material, and the door, in a predefined portion along at least one edge of the door, has a smaller cross sectional thickness than at a center of the door.

4. The door arrangement according to claim 3, wherein the sandwich material of the door comprises a core of a honeycomb structure.

5. The door arrangement according to claim 4, wherein the core is composed of aluminum.

6. The door arrangement according to claim 4, wherein the core is composed of a phenolic resin-impregnated material.

7. An aircraft area, comprising:
a door aperture arranged in an outer skin of an aircraft; and a door arrangement according to claim 1,
the door of the door arrangement being configured to close the door aperture from an inside of the outer skin, and
the articulated arm of the door arrangement being fixed to the aircraft area.

8. The aircraft area according to claim 7, the door comprising a peripheral area, which overlaps with at least one of the outer skin or a component of the aircraft area arranged thereon when the door closes the door aperture.

9. The aircraft area according to claim 7, wherein the articulated arm is configured to arrange the door by rotation relative to the door aperture, the projected area of the door in a top view of the door aperture, at least in parts, not overlapping the projected area of the door aperture.

10. The aircraft area according to claim 7, the aircraft area in an area between a main door frame and a former arranged for the main door frame comprising no additional stringers or no reinforcements running in the longitudinal direction of the aircraft.

11. The aircraft having at least one aircraft area according to claim 7.

12. A door arrangement for an aircraft, comprising:
a door, configured to close an aperture in an outer skin of the aircraft,
an articulated arm, fixed by a first end to the door, and configured to move the door in at least two translational directions and at least two rotational directions, wherein the articulated arm comprises:
at least two arm members,
a first articulated link arranged between the two arm members,
a second articulated link arranged at the first end of the articulated arm, and a third articulated link arranged at the second end of the articulated arm, wherein at least one of the arm members comprises at least two portions and being configured to move at least the two portions relative to one another in a longitudinal direction of the respective arm member.

13. The door arrangement according to claim 12, wherein at least the one arm member comprises a linear drive configured to move the two portions relative to one another.

\* \* \* \* \*